United States Patent [19]

Seto

[11] Patent Number: 5,124,810

[45] Date of Patent: Jun. 23, 1992

[54] IMAGE READING APPARATUS

[75] Inventor: Toshio Seto, Zama, Japan

[73] Assignee: Ricoh Company, Ltd., Tokyo, Japan

[21] Appl. No.: 523,346

[22] Filed: May 14, 1990

[30] Foreign Application Priority Data

May 26, 1989 [JP] Japan .................. 1-131588

[51] Int. Cl.⁵ .............................. H04N 1/10
[52] U.S. Cl. ..................... 358/106; 358/474
[58] Field of Search ............. 358/464, 462, 457, 446, 358/447, 474, 463, 498, 496

[56] References Cited

U.S. PATENT DOCUMENTS

| | | | |
|---|---|---|---|
| 4,601,058 | 7/1986 | Seto | 382/52 |
| 4,614,976 | 9/1986 | Ogata | 358/496 |
| 4,660,082 | 4/1987 | Tomohisa et al. | 358/446 |

FOREIGN PATENT DOCUMENTS

| | | |
|---|---|---|
| 0254235 | 1/1988 | European Pat. Off. |
| 57-135573 | 8/1982 | Japan |
| 59-57575 | 10/1984 | Japan |
| 63-148379 | 7/1988 | Japan |
| 64-16065 | 1/1989 | Japan |

Primary Examiner—Edward L. Coles, Sr.
Assistant Examiner—Jerome Grant II
Attorney, Agent, or Firm—Oblon, Spivak, McClelland, Maier and Neustadt

[57] ABSTRACT

An image reading apparatus for reading an image on a sheet. The apparatus comprises an image reading part for scanning a predetermined area, including the sheet, one scanning line by one scanning line for producing an output image signal. A white reference image part is provided within the predetermined area so as to be scanned by the image reading part. A black reference image part is provided within the predetermined area so as to be scanned by the image reading part. A white reference memory is supplied with the output image signal from the image reading part for storing the output image signal supplied thereto, and a black reference memory is supplied with the output image signal from the image reading part for storing the output image signal supplied thereto. An image correction part is supplied with the output image signal from the image reading part and further with a first reference signal and a second reference signal from the white and black reference memories for producing a corrected image signal. A controller controls the reading operation of the white reference memory and the black reference memory. In the image forming apparatus, the effect of shading is eliminated, the quality of image recording is improved, and the size of the sheet on which the image to be read can be detected.

13 Claims, 15 Drawing Sheets

TO CONTROLLER 102

TO CONTROLLER 102

IMAGE READING APPARATUS

BACKGROUND OF THE INVENTION

The present invention generally relates to reading of images, and more particularly to an image reading apparatus having a movable optical system for scanning an image.

Generally, there are two distinct types of apparatuses used for image reading, one having a fixed optical system and the other having a movable optical system. In the former type apparatus called a sheet feeding type, the reading or scanning of the image is performed by feeding a sheet or document on which the image to be read is formed, while holding the optical system stationary. In the latter type apparatus called a stationary sheet type, on the other hand, the reading is performed by moving the optical system while holding the sheet stationary.

As the former type apparatus lacks the movable optical system, it can be produced at a low cost, and thus this type apparatus is used commonly as the scanner of a facsimile apparatus and the like. It should be noted that the automatic sheet feeding system used in the former type apparatus can be constructed substantially simpler and cheaper than the movable optical system used in the latter type apparatus.

On the other hand, the latter type apparatus is advantageous, though having a complex construction, in that skewing of the sheet during the sheet feeding does not occur and a high quality image is guaranteed. Further, images such as those formed on the pages of books or magazines, which cannot be read by the sheet feeding type apparatus, can be read easily.

Further, there is another type of image reading apparatus called a dual mode image reading apparatus, wherein the movable optical system is combined with a sheet feeding system so that the reading of the image is made selectively in either a first mode or a sheet feeding mode wherein each of the sheets which carries an image thereon is separated one by one from a stack of sheets and fed one after another, passing through an image reading location while maintaining the movable optical system stationary, and a second mode or a stationary sheet mode wherein the optical system is moved so as to scan over the images on the sheet which is held stationary.

FIG. 1 shows an example of such a conventional dual mode image reading apparatus. Referring to FIG. 1, in the stationary sheet mode, a document or a sheet 2 placed on a contact glass 1 is illuminated by a line- or bar-shaped light source 3 extending parallel to the direction of the horizontal scanning line, and the light reflected back from the image on the sheet 2 is detected by a line image sensor 8 provided at a predetermined position of the apparatus, after a number of reflections by mirrors 4, 5 and 6.

The light source 3 and the mirror 4 are mounted on a slider 9 which is movable parallel to the contact glass 1 in the direction perpendicular to the horizontal scanning line. On the other hand, the mirrors 5 and 6 are mounted on another slider 10 which is also movable in the same direction as the slider 9, though with a speed which is one-half of the speed of the slider 10. Further, a press pad 11 is used for pressing the sheet on the contact glass 1.

In the case of the dual mode image reading apparatus, this press pad 11 is further provided thereon with a predetermined region for placement of a sheet or a stack of sheets to be fed to the image reading location in the sheet feeding mode. In correspondence to this region, a guide part 12 shown in FIG. 1 is provided for guiding the sheet during its feeding.

In the sheet feeding mode, each of the sheets placed on the guide part 12 is separated one by one from the stack by a pair of feed rollers 13, and is fed one after another to a predetermined image reading location A for reading the images by a pair of feed rollers 14. Further, another pair of rollers 15 are provided for discharging the sheet passed through the image reading location A. The sheet thus discharged is collected in a sheet tray 16. Along the path of the sheet, other guide members 17 and 18 are provided.

Further, a home position sensor 19 is provided for detecting that the movable sliders 9 and 10 are located at respective reference positions. These reference positions of the sliders 9 and 10 are usually chosen so as to coincide with the image reading location A, and the sliders 9 and 10 are held stationary at this position as long as the apparatus is operated in the sheet feeding mode.

In the image forming apparatus using the bar-shaped light source 3, there is a general problem, irrespective of whether the image forming apparatus is the sheet feeding type, the stationary sheet type or the dual mode type, in that the optical radiation illuminating the image is not uniform but varies along the elongating direction of the bar-shaped light source 3. Further, the sensitivity of each photosensitive device forming the line image sensor 8 is often scattered device by device. Furthermore, the optical radiation from the bar-shaped light source 3 may be modified significantly, even in an ideal case where the radiation is uniform in the elongating direction of the light source, due to the well known effect of a decrease of light intensity when light is passed through a lens with an offset from the optical axis.

Thus, even when a totally white blank image is read, photosensitive devices forming the line image sensor 8 produce output image signals with various output levels as illustrated in FIG. 2A, in spite of the fact that the output levels of the photosensitive devices should be uniform as shown in FIG. 2B. Such a variation of the output level of the line image sensor 8 is known as "shading".

In order to eliminate the problem of shading, the conventional image reading apparatus generally uses a construction shown in FIGS. 3A and 3B.

Referring to FIGS. 3A and 3B, a part 18a of the guide member 18 facing the contact glass 1 in correspondence to the reading location A is coated white as illustrated by PW, and this white part PW is used as a reference image for defining the white level of the image to be read. Further, an image processing system shown in FIG. 4 is used for processing the output image of the line sensor 8 in combination with the construction shown in FIGS. 3A and 3B.

Referring to FIG. 4, analog output image signals represented as "AV" produced by the photosensitive devices of the line sensor 8 are supplied to an amplifier 20 for amplification, and supplied further to an analog-to-digital converter 21, a bottom hold circuit 22, and a peak hold circuit 23 after amplification. The bottom hold circuit 22 detects the lowest level of the analog output image signals AV for each line of the image and produces an output voltage −Vr indicative thereof. The output voltage −Vr is supplied to the analog-to-digital converter 21 as a first reference voltage, to be described later. Similarly, the peak hold circuit 23 detects the highest level of the analog output image signals AV for each line and produces an output voltage indicative thereof. This output voltage is used to adjust the output of a digital-to-analog converter 25 to be described later, and the output of the digital-to-analog converter 25 is supplied to the analog-to-digital converter 21 as a second reference voltage +Vr.

In the analog-to-digital converter 21, each of the incoming analog image signals AV is converted to a corresponding digital image data DV having a predetermined number of bits. The analog-to-digital converter 21 is supplied thereby with the first reference voltage −Vr and the second reference voltage +Vr, and each of the input image signals AV is normalized with respect to the voltage +Vr and the voltage −Vr prior to the analog-to-digital conversion. In other words, the digital image data DV represents a percentage of the output image signals AV with respect to the maximum value of the signal AV set at +Vr and the minimum value set at −Vr. The output digital image data DV is then supplied on the one hand to a line buffer 24 and on the other hand to a circuit of the following stage. The line buffer 24 stores the output digital image data DV supplied thereto under the control of a controller 101 and supplies the data DV to the digital-to-analog converter 25, also under the control of the controller 101. The digital-to-analog converter 25 converts the digital data DV read out from the line buffer 24 to analog signals and the magnitude of the analog signals thus obtained is further adjusted in proportion with the output of the peak hold circuit 23 to form the reference voltage +Vr.

Hereinafter, the shading correction according to the prior art system of FIG. 4 will be described for the case where the image reading apparatus is operated in the sheet stationary mode.

Referring to FIGS. 1, 3A and 4, the controller 101 moves the sliders 9 and 10 when starting the reading of a sheet, until the home position sensor 19 detects that the sliders 9 and 10 are located at respective reference positions. In this state, the line image sensor 8 reads the white reference image PW formed on the guide plate 18.

During this reading of the white reference image PW, the digital-to-analog converter 25 is controlled by the controller 101 such that the reference voltage +Vr is set to a maximum value that the digital-to-analog converter 25 can produce irrespective of digital data supplied thereto, and reading of the white reference image PW is performed under this state. The proportional adjustment of the reference voltage +Vr by the output of the peak hold circuit 23 is also disabled by the controller 101 during this procedure. On the other hand, the lowest level of the analog image signals AV is detected by the bottom hold circuit 22 and is applied to the analog-to-digital converter 21 as the reference voltage −Vr.

In response to the reading of the white reference image PW as such, the analog image signals AV from the line image sensor 8 are converted to the corresponding digital image signals DV and subsequently stored in the line buffer 24 which is set ready for storing data by the controller 101 at the beginning of reading of the white reference image PW. It should be noted that, in this state, the line buffer 24 stores the white reference level in the form of digital data, and the digital data thus stored in the line buffer 24 reflects the variation of the characteristics of the photosensitive devices as well as the variation of intensity of the light incident to each of the photosensitive devices after the detection of the white reference image PW is made.

Next, the controller 101 moves the sliders 9 and 10 such that the image reading location, which was previously located at the position A, is now located in correspondence to a head part of the sheet 2, and the first line of the document is read by the line image sensor 8. During the reading, the analog-to-digital converter 21 is provided with the reference voltage +Vr from the digital-to-analog converter 25 and further with the output −Vr from the bottom hold circuit 22, and the input analog image signal AV is converted to the digital image signal DV on the basis of these reference voltages. It should be noted that the reference voltage +Vr provided by the digital-to-analog converter 25 is adjusted in accordance with the output of the peak hold circuit 23, and any time-dependent variation of the intensity of illumination by the light source 3, which might have occured since the last reading of the reference white image PW, is compensated.

The obtained digital image signal DV is normalized with respect to the first reference voltage +Vr defining the maximum of the image signal AV and the second reference voltage −Vr defining the minimum, as already described. As the line buffer 24 stores the white reference level, the output image data DV, produced by the analog-to-digital converter 21 using the reference voltage +Vr, is compensated with respect to the variation of the white level. In other words, the effect of the shading is eliminated from the digital image data DV, as shown in FIG. 2B. It should be noted that the controller 101 prohibits the content of the line buffer 24 from being updated once the reading of the image on the sheet is started, until the reading of that sheet is completed and reading of the next sheet is started.

The same procedure is applicable also to the case where the reading of the image is performed in the sheet feeding type image reading apparatus. In this case, the line buffer 24 is set ready for reading by the controller 101 at the beginning of the reading procedure, and the white image PW on the guide plate 18 is read prior to the feeding of the sheet. The digital image data DV thus obtained by the analog-to-digital converter 21 is stored subsequently in the line buffer 24.

Next, the feeding of the sheet is started by driving the feed rollers 14 under the control of the controller 101 (see FIG. 7A), and the image on each of the sheets is read one after another by the line image sensor 8 while the sliders 9 and 10 are held stationary at the respective reference positions. The output analog image signal AV is supplied to the digital-to-analog converter 21 in a manner similar to the foregoing case of the sheet stationary mode and the conversion to the digital image data DV is performed using the white reference level stored in the line buffer 24.

In the foregoing approach for eliminating the shading, there still remains a problem that no correction is applied with respect to the dark current of the line image sensor 8, which may vary in each photosensitive device. Such a variation of the dark current causes a variation of the bottom level or black level, as shown by the hatching in FIG. 5A. Such a variation of the black level is caused also by a flare of light.

Thus, when the foregoing correction is applied only to the white level, as shown in FIG. 5B, the effective output of the line image sensor 8 representing the actual light intensity detected by the line image sensor 8 is varied even when the image read by the sensor 8 is entirely black. Such a variation causes a deterioration of the quality of the image read from the sheet.

In the prior art image reading apparatus, particularly of the sheet feeding type, there exists another problem regarding detection of the size of a sheet.

Referring to FIG. 6 showing a mechanism used in the prior art apparatus for detection of the size of the sheet, there is provided the guide part 12 for guiding the feeding of the sheet comprising a fixed first guide plate 12a and a second guide plate 12b provided movable with respect to the first guide plate 12a in the direction perpendicular to the direction of sheet feeding. In FIG. 6, it should be noted that the direction of feeding of the sheet is perpendicular to the plane of the drawing. Further, the guide plate 12b carries a light shield plate 12c such that the plate 12c is located below the guide plate 12a. Furthermore, there are provided photosensors S1, S2 and S3 below the guide plate 12a such that the light shield plate 12c interrupts incidence of light to the photosensors S1, S2 and S3.

In operation, the movable guide plate 12b is adjusted such that the sheet placed on the guide part 12 is held laterally between the fixed guide plate 12a and the movable guide plate 12b, and in response thereto, the light shield plate 12c selectively interrupts the incidence of light to the photosensors S1, S2 and S3. Thus, the detection of the size of the sheet placed on the guide part 12 is made in response to the output of the photosensors S1, S2 and S3.

In such a conventional mechanism, however, there is a problem in that the resolution or fineness of detection of the size of the sheet is unsatisfactory. More specifically, there arises a problem that the size of the sheet cannot be detected properly when the sheet is not of a standardized sheet size. Further, when sheets having various sizes are mixed, the detection of the size of the sheet is made only for the largest sheet and there arises an inconvenience in that the reading of an image on a sheet having a smaller size is made in a manner similar to the case regarding the reading of an image on the largest size sheet.

SUMMARY OF THE INVENTION

Accordingly, it is a general object of the present invention to provide a novel and useful image reading apparatus wherein the foregoing problems are eliminated.

Another object of the present invention is to provide an image reading apparatus wherein the quality of image reading is improved.

Another object of the present invention is to provide an image reading apparatus wherein detection of the size of the sheet on which the image to be read is recorded, is made with high resolution.

Another object of the present invention is to provide an image reading apparatus for reading an image on a sheet, comprising: image reading means for reading the image on the sheet by scanning the sheet scanning line by scanning line and producing an output image signal, a white reference part provided so as to be scanned by the image reading means, a black reference part provided so as to be scanned by the image reading means, white reference memory means supplied with the output image signal from the image reading means in response to the image reading means scanning the white reference part for storing the output image signal supplied thereto, black reference memory means supplied with the output image signal from the image reading means in response to the image reading means scanning the black reference part for storing the output image signal supplied thereto, image correction means supplied with the output image signal from the image reading means line sequentially in response to the image reading means scanning the sheet, said image correction means being supplied further with a first reference signal indicative of the image signal stored in the white reference memory means and with a second reference signal indicative of the image signal stored in the black reference memory, for producing a corrected image signal such that the corrected image signal has a maximum level corrected with reference to the first reference signal and a minimum level corrected with reference to the second reference signal, and control means for controlling the white reference memory means and the black reference memory means such that the white reference memory means stores the output image signal of the image sensing means only when the image sensing means scans the white reference part and such that the black reference memory means stores the output image signal of the image sensing means only when the image sensing means scans the black reference part.

According to the present invention, the shading correction of the optical reading system can be performed both with respect to the peak level and with respect to the bottom level of the image signal and thereby the quality of the image read by the apparatus is significantly improved. Particularly, the shading effect caused by the dark current of the photosensitive devices forming the image sensing means or the shading effect caused by a flare of light, which has been hitherto not corrected, is entirely eliminated. Further, the feature regarding the ability of the present invention to read both the white and black reference parts allows the detection of the size of the sheet on the basis of the image signal detected by the image sensing means, by monitoring the change of the image signal line by line while passing the sheet over the white and black reference parts. Thereby, the resolution of size detection of the sheet can be increased to a degree which is comparable to the resolution of reading of the image. Further, the present invention can provide a continuous detection of sheet skew by monitoring the passage of the sheet across the white and black reference parts.

Other objects and further features of the present invention will become apparent from the following detailed description when read in conjunction with attached drawings.

DETAILED DESCRIPTION

Figure 1:
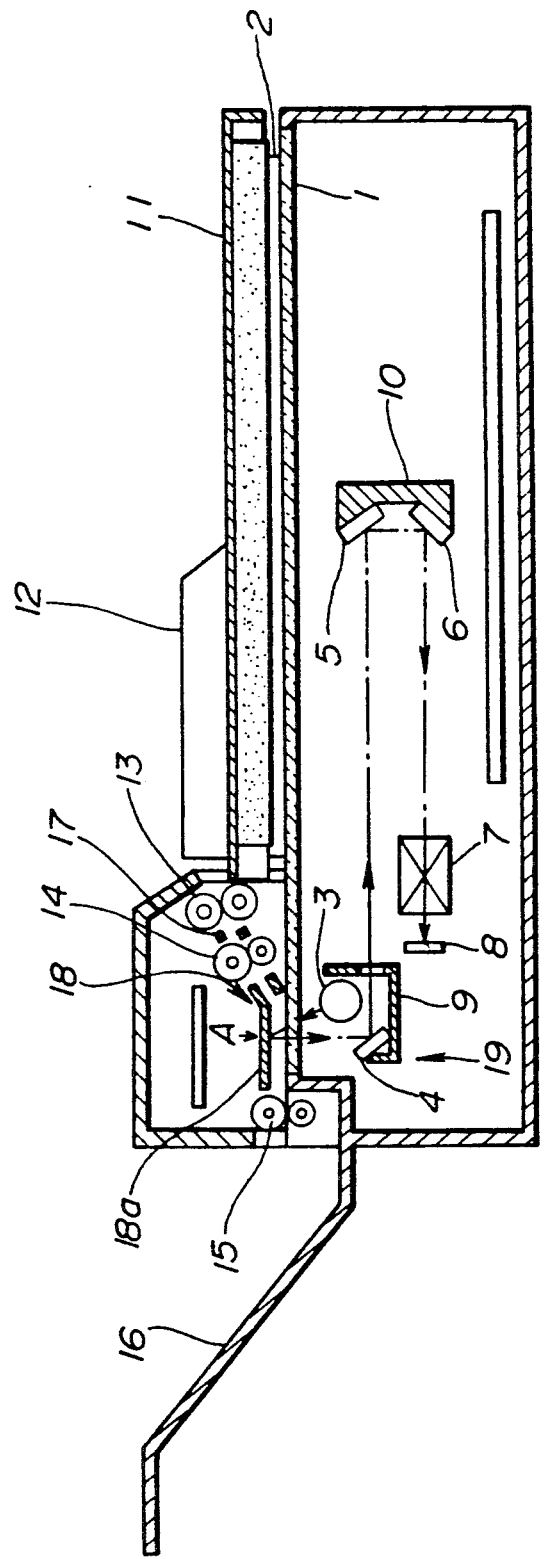
FIG. 1 is a schematical diagram showing the structure of a conventional dual mode image reading apparatus.
Figure 2A:
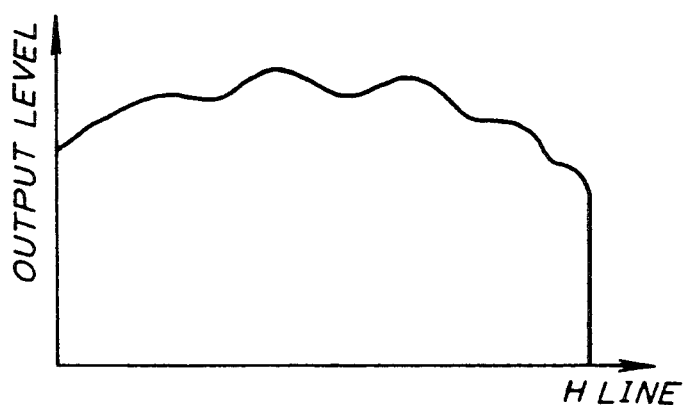
FIGS. 2A and 2B are diagrams for explaining the shading effect pertinent to the prior art apparatus.
Figure 2B:
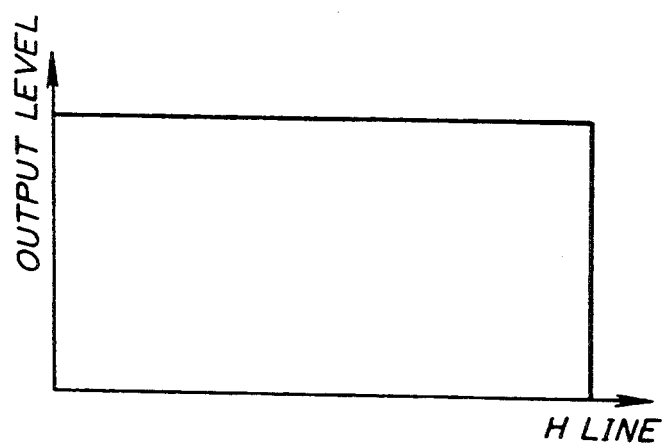

The present invention will now be described with reference to the embodiments thereof. In the description of the present invention hereinafter given, the parts which are the same as the parts previously described with reference to the prior art are given identical reference numerals and the description thereof will be omitted. It should be noted that the image reading apparatus of the present invention has a construction which is generally similar to the construction shown in FIG. 1.

Figure 3A:
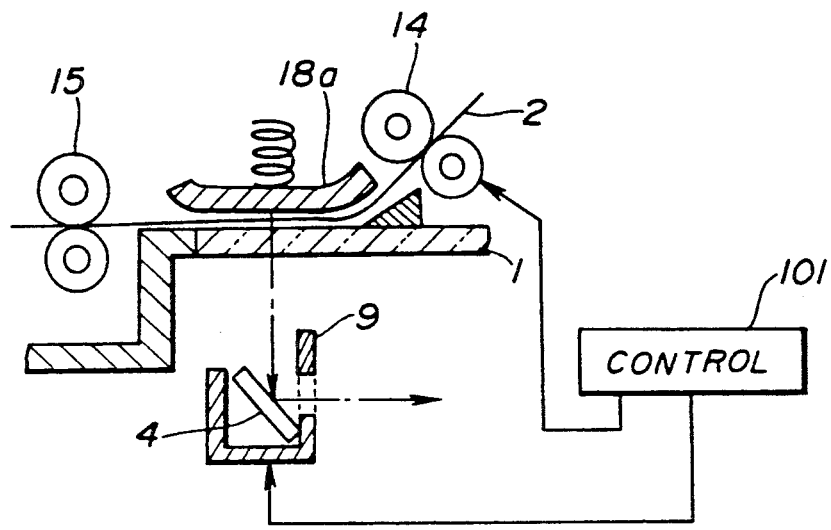
FIGS. 3A and 3B are diagrams showing a mechanical structure used conventionally for eliminating the shading effect.
Figure 3B:
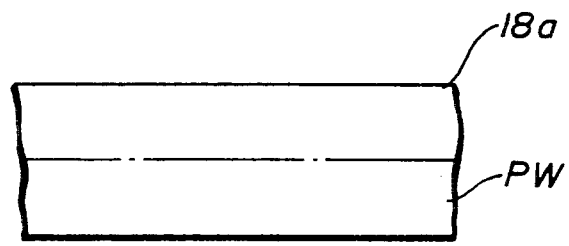
Figure 7A:
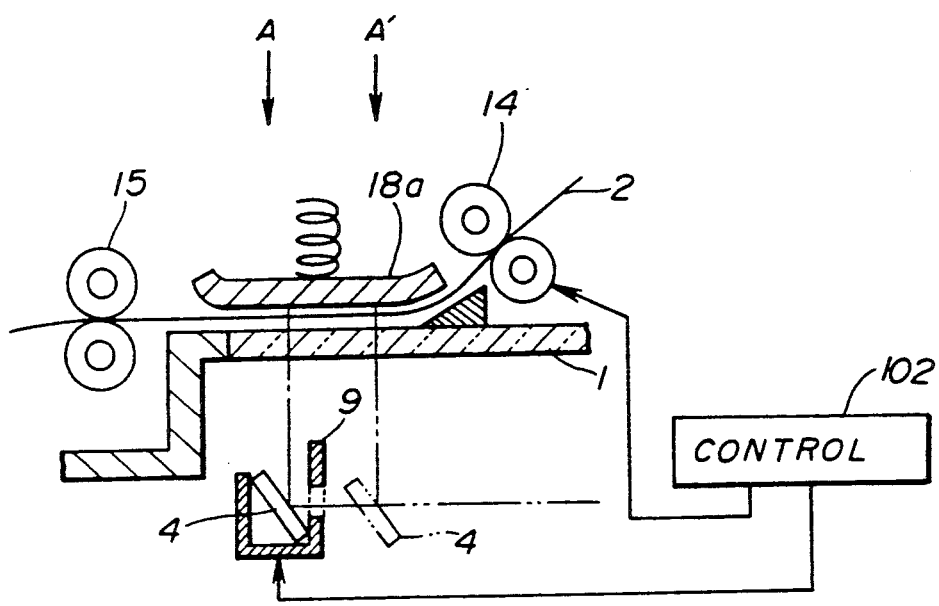
FIGS. 7A and 7B are diagrams showing a mechanical structure for eliminating the shading effect according to a first embodiment of the present invention.
Figure 7B:
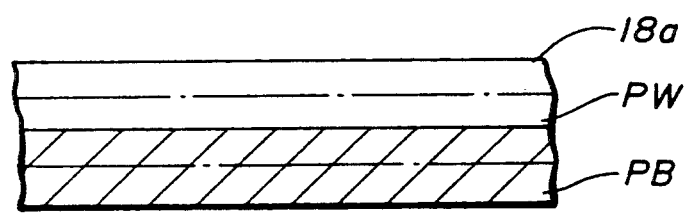

FIGS. 7A and 7B show the mechanical parts of a first embodiment of the present invention. Similarly to the case of the prior art shown in FIGS. 3A and 3B, the slider 9 and the slider 10 (not shown) are movable under the control of a controller 102 in the stationary sheet mode. In the sheet feeding mode, the feed rollers 14 are driven under the control of the controller 102.

In this embodiment, the guide plate 18 is formed not only with the white reference image PW but also with a black reference image PB as shown in FIG. 7B. It should be noted that this white reference image PW and the black reference image PB form a stripe pattern of black and white extending perpendicularly to the plane of the drawing of FIG. 7A in correspondence to the part 18a of the guide plate 18.

Figure 8:
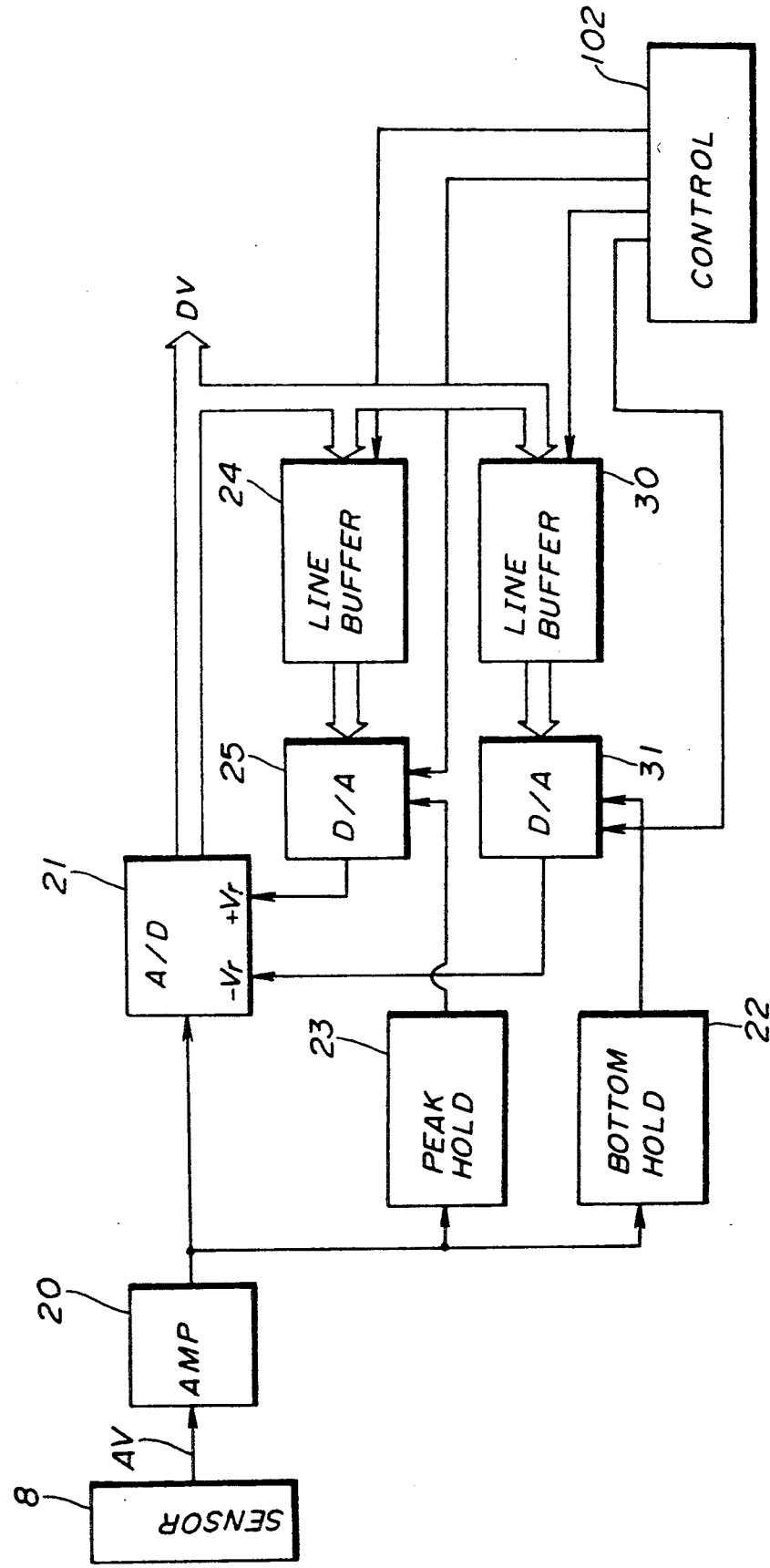
FIG. 8 is a block diagram showing a system for eliminating the shading effect in combination with the mechanical structure of FIGS. 7A and 7B according to the first embodiment of the present invention.

FIG. 8 shows a circuit used in combination with the construction of FIG. 7A for shading correction.

Figure 4:
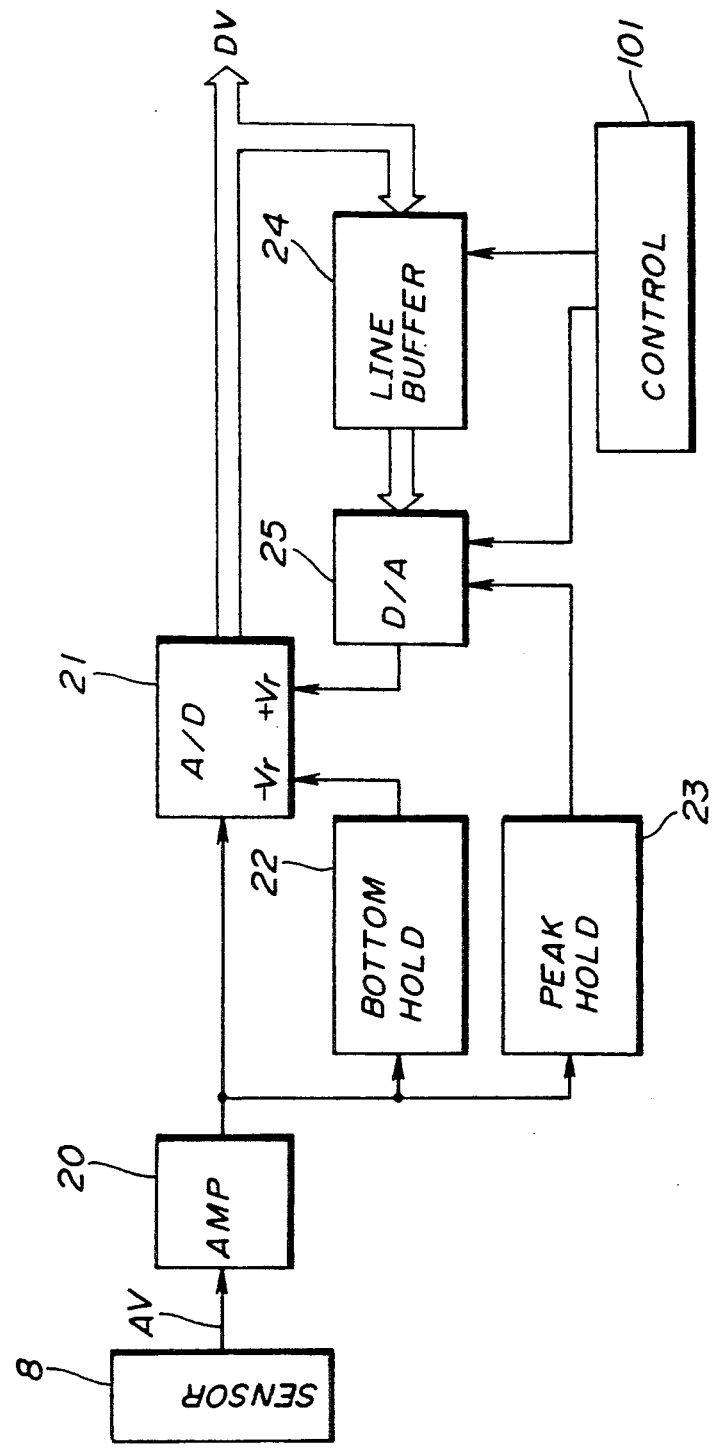
FIG. 4 is a block diagram showing a conventional system used for eliminating the shading effect in combination with the mechanical structure of FIGS. 3A and 3B.
Figure 5A:
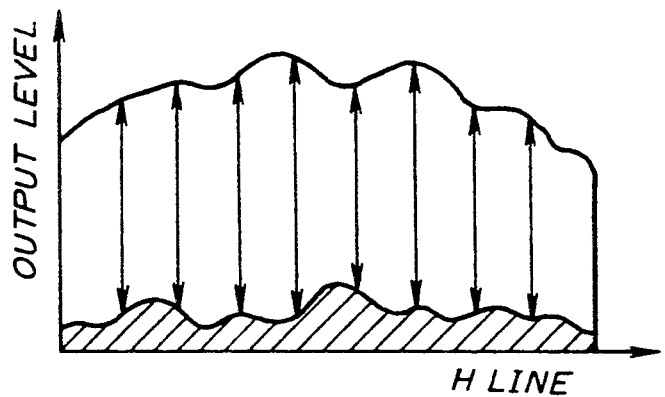
FIGS. 5A and 5B are diagrams showing the problem of shading still remaining in the prior art system of FIGS. 3A, 3B and 4.
Figure 5B:
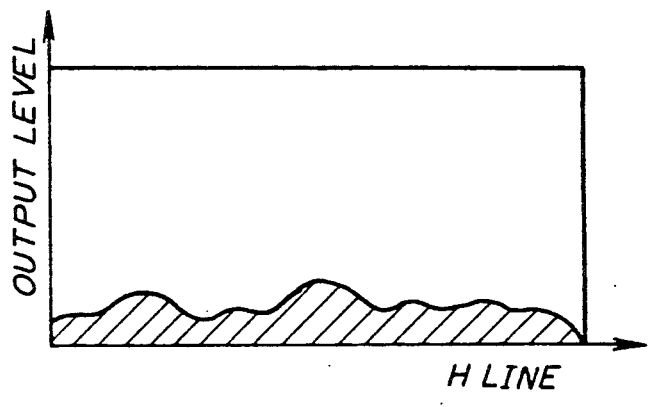
Figure 6:
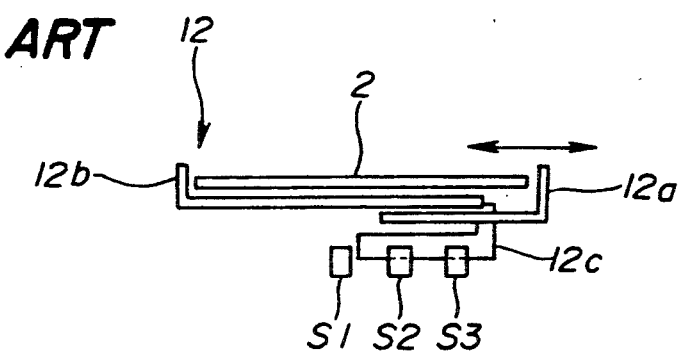
FIG. 6 is a schematical diagram showing a mechanism used conventionally for detecting the size of the sheet.

In this circuit, the controller 101 of the circuit of FIG. 4 is replaced with a controller 102 which operates in exactly the same manner as the controller 101 with respect to the control of the line buffer 24, the digital-to-analog converter 25, the sliders 9 and 10, and the sheet feed rollers 14. Further, another line buffer 30 and another digital-to-analog converter 31 are provided such that the output image data DV of the analog-to-digital converter 21 is supplied to the line buffer 30 under the control of the controller 102 and the digital-to-analog converter 31 produces an output in response to the digital data DV stored in the line buffer 30. The output of the converter 31 is supplied to the analog-to-digital converter 21 as the reference voltage $-Vr$. Further, the output of the bottom hold circuit 22 is supplied to the digital-to-analog converter 31 for adjusting the magnitude of the reference voltage $-Vr$.

Next, the operation of the image reading apparatus of this embodiment will be described in regard to a case, in which the apparatus is operated in the stationary sheet mode.

Preceding the reading of an image on the sheet in the stationary sheet mode, the controller 102 moves the sliders 9 and 10 to their respective reference positions. In this state, the mirror 4, carried by the slider 9, is located immediately below the white reference image PW, as illustrated in FIG. 7A by a continuous line. Thus, the white reference image PW is supplied to the line image sensor 8 (FIG. 1) after reflections at the mirrors 4, 5 and 6.

In this state, the controller 102 controls the line buffer 24 so that it is ready for storing one line image, and further controls the digital-to-analog converters 25 and 30 such that the reference voltages $+Vr$ and $-Vr$ are set to respective maximum and minimum values. In response to this, the range used by the analog-to-digital converter 21 for receiving the incoming image signal AV is set to the maximum, and the reading of the white reference image PW is made for one line under this condition. As the line buffer 24 is set ready for reading a data, the white reference image PW thus read by the line image sensor 8 is stored in the line buffer 24 as the digital image data DV representing the reference white level. It should be noted that during this process, the controller 102 controls the line buffer 30 so that reading of the image data DV by the line buffer 30 is disabled.

Next, the controller 102 moves the sliders 9 and 10 so that the mirror 4 is located immediately below the black reference image PB, as shown by the broken line in FIG. 7A, and one line of the black reference image PB is read under this condition. During the reading, the controller 102 disables the line buffer 24 and enables the line buffer 30. Further, the controller 102 sets the reference voltages $+Vr$ and $-Vr$ to their maximum and minimum values respectively and associated therewith, the range of the analog-to-digital converter 21 for the incoming analog image signal AV is set to the maximum similarly to the case of reading the white reference image PW. As a result, the black reference image PB for one line is stored in the line buffer 30 in the form of digital data.

It should be noted that, as a result of reading of the white reference image PW and the black reference image PB, the variation of the white reference level and the variation of the black reference level caused as a result of the shading effect are stored in the line buffers 24 and 30 respectively.

After the reading of the white reference image PW and the black reference image PB is completed, the controller 102 moves the sliders 9 and 10 such that the mirror 4 held on the slider 9 is located immediately below the head part of the sheet 2 and reading of the image on the sheet is started line by line while moving the sliders 9 and 10 in synchronization with the progress of reading.

In response to the start of reading of the image on the sheet 2, the controller 102 controls the line buffers 24 and 30 such that the updating of the line buffers 24 and 30 is disabled. Further, the controller 102 controls the digital-to-analog converters 25 and 31 such that the output thereof, produced in response to the content of the line buffers 24 and 30, is modified in accordance with the output of the peak hold circuit 23 and the output of the bottom hold circuit 22, respectively. By modifying the reference voltages $+Vr$ and $-Vr$ in response to the output of the peak hold circuit 22 and the bottom hold circuit 23, any change of the illumination level which might have occured since the last reading of the white reference image PW and the black reference image PB is successfully compensated. In other words, the change of the background level of the document is compensated. It should be noted that this compensation of the background level is applied to the peak level as well as to the bottom level by the use of the peak hold circuit 23 and the bottom hold circuit 22.

Figure 9A:
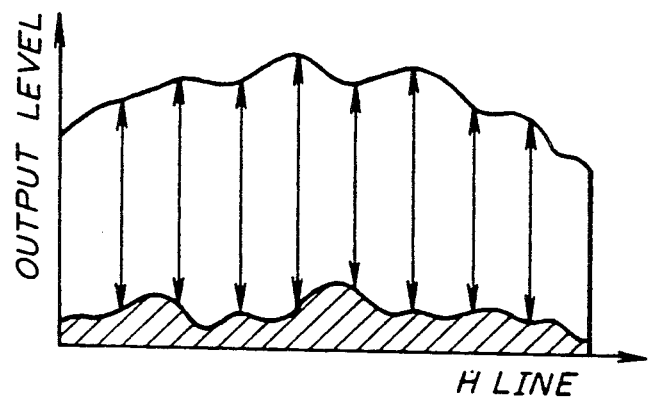
FIGS. 9A and 9B are diagrams for explaining the total elimination of the shading effect according to the first embodiment of the present invention.
Figure 9B:
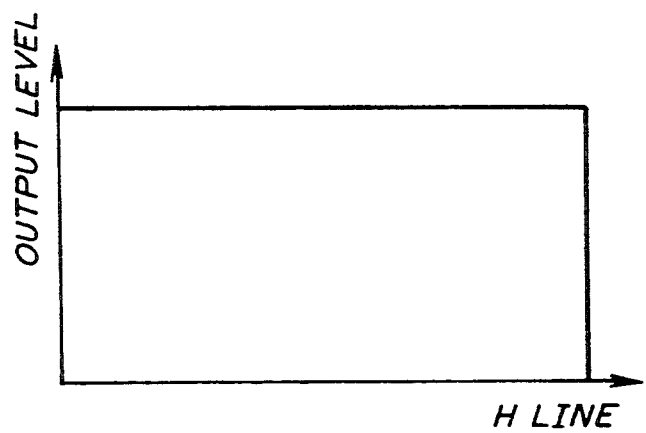

As already described, the analog-to-digital converter 21 sets its input signal range for receiving the incoming analog image signal AV so that the range is defined by the reference voltage $+Vr$ and the other reference voltage $-Vr$. As the reference voltage $+Vr$ and the reference voltage $-Vr$ are determined for each of the photosensitive devices of the line image sensor 8 on the basis of the image data DV of the white reference image PW and the black reference image PB stored in the line buffers 24 and 30 as well as on the basis of the output of the peak hold circuit 23 and the bottom hold circuit 22, the effect of shading as shown in FIG. 9A is effectively eliminated from the input analog image signal AV prior to the analog-to-digital conversion as shown in FIG. 9B. It should be noted that, as a result of provision of the line buffer 30 and the digital-to-analog converter 31, the effect of variation of output of the photosensitive devices of the line image sensor 8 when reading the dark part of the image on the sheet 2 is effectively compensated. The output image data DV produced by the analog-to-digital converter 21 thus represents a digital image data from which the effect of shading is completely eliminated with respect to the peak level output and the bottom level output of the line image sensor 8.

Such a compensation provides not only the elimination of variation of dark current for each of the individual photosensitive devices but also the elimination of the effect of a flare of light and the like, by directly detecting the reference black image PB under illumination by the bar-shaped light source 3. With this regard, the present invention is advantageous over prior art apparatus having the capability of correcting the shading effect with respect to the bottom level wherein the shading compensation for the bottom level is made by turning off the light source 3. It should be noted that such a prior art apparatus cannot compensate for the effect of a flare of light and the like which occurs under the actual illumination of the image by the light source 3.

The foregoing construction shown in FIGS. 7A and 7B as well as that shown in FIG. 8 is also applicable to the case of image reading performed in the sheet feeding mode. In this case, the controller 102 additionally controls the feed rollers 14 such that the feeding of the sheet 2 is disabled at the beginning of the image reading and the reading of the white reference image PW is performed by setting the position of the mirror 4 immediately below the image PW. For this purpose, the controller 102 controls the sliders 9 and 10 at the respective reference positions, which is similar to the case of the prior art apparatus.

Next, the controller 102 moves the sliders and 10 so that the mirror 4 is located at the position shown by the broken line in FIG. 7A immediately below the black reference image PB and the reading of the image PB is performed as already described.

In response to the completion of reading of the white reference image PW and the black reference image PB, the controller 102 energizes the feed rollers 14 and feeding of the sheet 2 is started, with the sheet 2 passing through the image reading location A. Further, the controller 102 returns the mirror 4 to the initial position corresponding to the image reading location A for reading the image on the sheet 2. Alternatively, the mirror 4 may be set at the second position represented by A' corresponding to the black reference image PB.

After the feeding of the sheet 2 is started, the image on the sheet 2 is read line by line with the range of the analog-to-digital converter 21 being set in accordance with the white reference level and the black reference level stored in the line buffers 24 and 30, until the reading of the image on that sheet is completed, which is similar to the case of the stationary sheet mode. It should be noted that the correction of the background level is applied by the peak hold circuit 23 and the bottom hold circuit 22 similarly to the former cases. Thereby, a digital image data DV from which the effect of shading is eliminated with respect to the peak level output and with respect to the bottom level output of the line image sensor 8, is obtained from the analog-to-digital converter 21.

It should be noted that the foregoing discussion is applicable also to apparatus other than the dual mode image reading apparatus such as the image reading apparatus of the sheet feeding type or the image reading apparatus of the stationary sheet type.

Figure 10A:
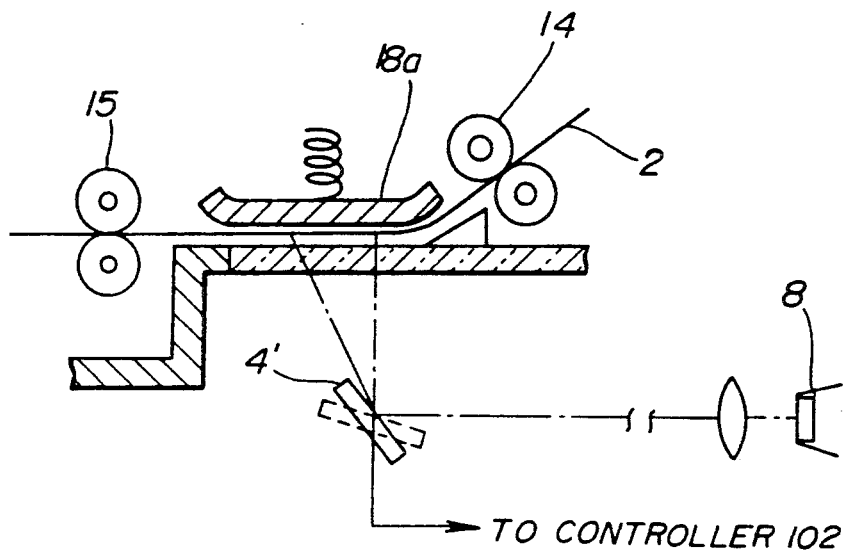
FIGS. 10A and 10B are diagrams showing a modification of the first embodiment of the present invention.
Figure 10B:
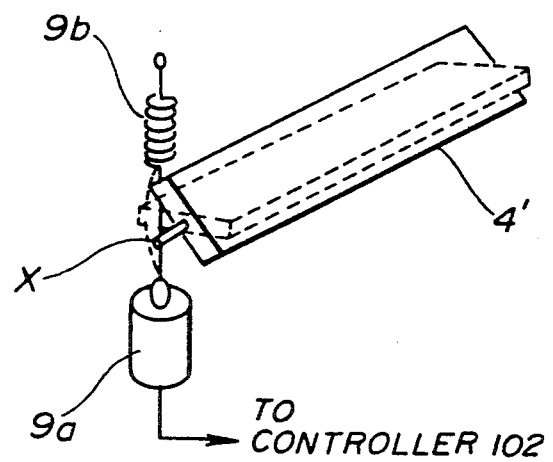

FIGS. 10A and 10B show a modification of the first embodiment apparatus. Referring to FIG. 10A, the construction of the first embodiment apparatus for moving the slider 9 carrying a mirror 4 by the controller 102 is replaced with a mechanism for tilting the mirror 4' under the control of the controller 102. FIG. 10B shows the mechanism for the mirror 4'. The mirror 4' is held rotatably about a shaft X on a suitable part of the apparatus, such as the slider 9, and is driven by a solenoid 9a of which the energization is controlled by the controller 102 under a force exerted by a return spring 9b.

In a first state of the mirror 4' shown by a continuous line in FIG. 10A, the white reference image PW is sent to the line image sensor 8 while in the second state of the mirror 4' shown by a broken line in FIG. 10A, the black reference image PB is sent to the line image sensor 8. Thus, the controller 102 controls the tilting of the mirror 4' at the beginning of reading of the image on the sheet 2 so that the white reference image PW is read first and the black reference image PB is read subsequently, preceding to the reading of the image on the sheet 2.

As the necessity for moving the slider 9 for reading the white reference image PW and the black reference image PB is eliminated in this modification, the construction of this modification is particularly advantageous when applied to the image reading apparatus of the sheet feeding type.

Figure 11:
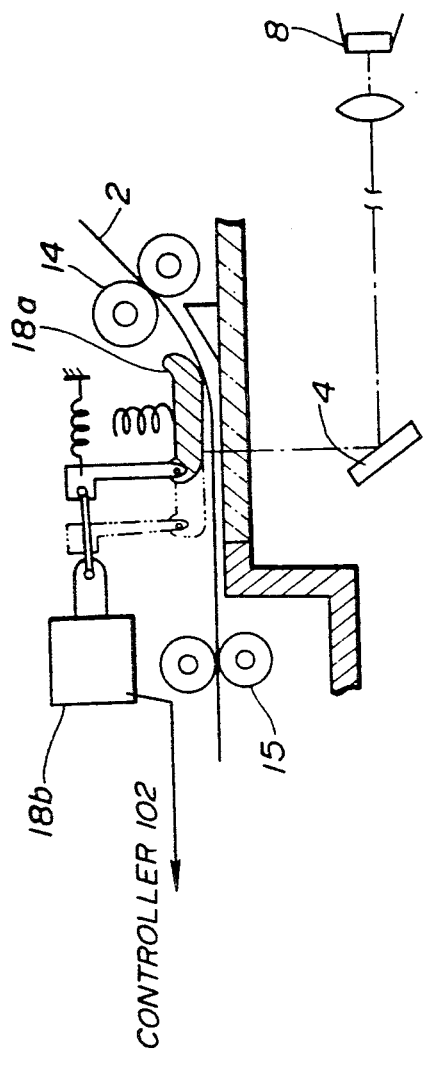
FIG. 11 is a diagram showing another modification of the first embodiment of the present invention.

FIG. 11 shows another modification of the first embodiment wherein the mirror 4 is held stationary on a suitable part of the image reading apparatus, such as the slider 9, and the guide plate 18a, carrying the white reference image PW and the black reference image PB thereon, is provided movably so that, in the first state shown in the drawing by a continuous line, the white reference image PW carried on the guide plate 18a is located immediately above the mirror 4, and in the second state shown in the drawing by a broken line, the black reference image PB carried on the guide plate 18a is located immediately above the mirror 4. In order to move the guide plate 18a, a solenoid 18b is provided and the solenoid 18b is controlled by the controller 102.

Similarly to the previous modification, the present modification of the first embodiment is advantageous with respect to the feature that it is not necessary to move the mirror 4 when reading the reference white image PW and the black reference image PB. Thus, the construction of this modification is suitable also for the image reading apparatus of the sheet feeding type wherein the mirror 4 is fixed on a frame of the apparatus.

Figure 12:
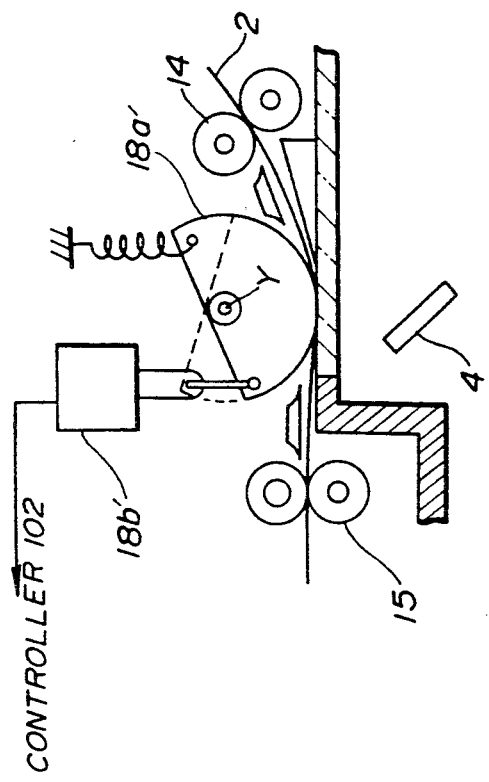
FIG. 12 is a diagram showing still another modification of the first embodiment of the present invention.

FIG. 12 shows still another modification of the first embodiment. Referring to FIG. 12, the guide plate 18a is constructed rotatably about a shaft Y, and is rotated by a solenoid 18b' under the control of the controller 102. Thus, in the first state shown by a continuous line in FIG. 12, the white reference image PW on the guide plate 18a' is sent to the line image sensor 8, while in the second state, the black reference image PB on the guide plate 18' is sent to the line image sensor 8. It should be noted that the guide plate 18a' carries the white reference image PW and the black reference image PB adjacent to each other as shown in FIG. 7B. The operation of the modifications shown in FIGS. 11 and 12 is obvious from the previous description and thus further description thereof will be omitted.

Next, a second embodiment of the present invention will be described with reference to FIG. 13.

Figure 13:
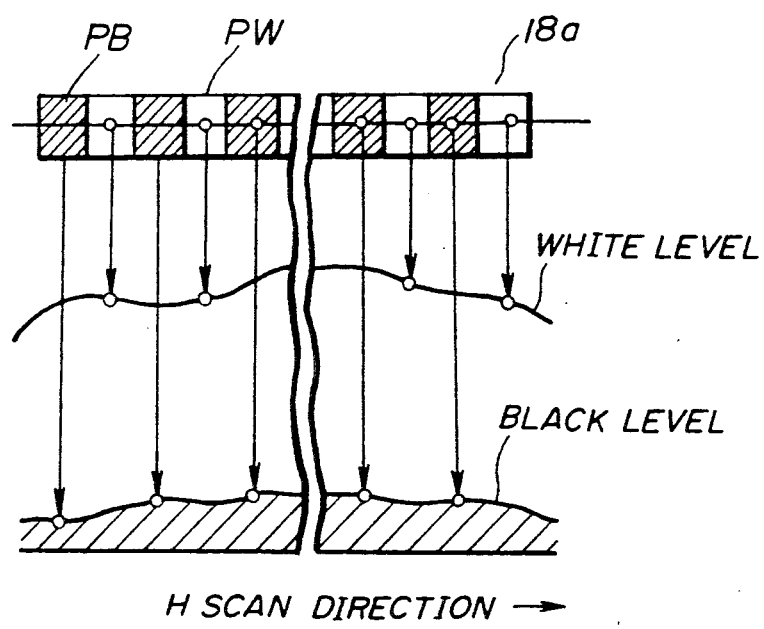
FIG. 13 is a diagram showing a second embodiment of the present invention.

In this embodiment, the white reference image PW and the black reference image PB are provided so as to form a single stripe-shaped pattern on the guide plate 18a as shown in FIG. 13. This pattern comprises an alternating repetition of white and black parts respectively acting as the white reference image PW and the black reference image PB, and the reading of these images PW and PB is performed at the same time by the line image sensor 8 under the control of the controller 102.

In this embodiment, the mirror 4 is held stationary during the reading of the reference images PW and PB. The guide plate 18a, too, is held stationary. In order to store the white reference image PW and the black reference image PB separately in the line buffers 24 and 30, the controller 102 controls the timing of the reading operation of the line buffers 24 and 30 so that the image data DV corresponding to the image signal AV from the line image sensor 8 is sampled along the horizontal scanning direction in correspondence to the alternating repetition of the white reference image PW and the black reference image PB. Thereby, the sampled digital image DV corresponding to the white reference image PW is stored in the line buffer 24 and the sampled digital image DV corresponding to the black reference image PB is stored in the line buffer 30.

According to the construction of this embodiment, neither the mirror 4 nor the guide plate 18a needs to be moved to read the reference images PW and PB, and thus, the construction of the image reading apparatus is significantly simplified.

Next, a third embodiment of the present invention for detecting the width of a sheet will be described.

In the case of reading the image in the sheet feeding mode wherein the reading of the image is made while setting the sliders 9 and 10 at their respective reference positions, as in the case shown in FIG. 7A, the sheet 2 is fed so as to pass over the reference images PW and PB. Thereby, when the mirror 4 is placed in the position shown in FIG. 7A in response to the reference position of the slider 9, the image sensor 8 detects an image wherein the white sheet 2 is located above a white background of the white reference image PW. Thus, the output image data DV of FIG. 14A obtained from the digital-to-analog converter 21 after the foregoing shading correction or its binary equivalent shown in FIG. 14B, does not show any substantial change over the entire range of horizontal scanning.

Figures 14A, 14B, 14C, 14D:
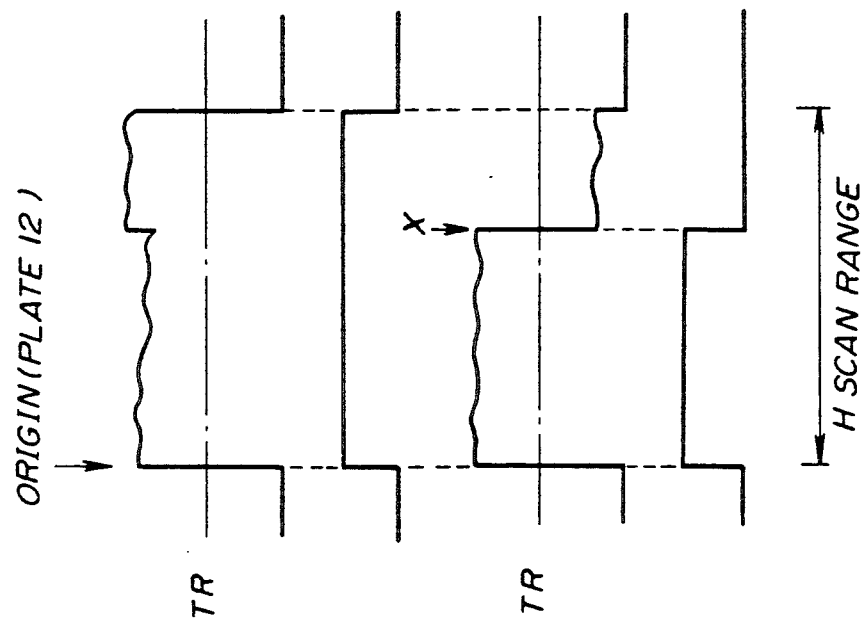
FIGS. 14A–14D are diagrams for explaining the detection of size of the sheet according to a third embodiment of the present invention.

On the other hand, when the passage of the sheet 2 over the black reference image PB is observed by the line image sensor 8 with the mirror 4 set at the position shown by the broken line in FIG. 7A, the digital image data DV from the analog-to-digital converter 21 changes suddenly in response to the horizontal scanning, as shown in FIG. 14C. Such a sudden change occurs in correspondence to the edge of the sheet where the black reference image PB is exposed as the background. Thus, by detecting the state of the output image data DV of FIG. 14C or its binary equivalent shown in FIG. 14D with respect to a threshold TR, it is possible for the line image sensor 8 to detect the width of the sheet 2 passing over the guide plate 18a. The term "width" herein means the size of the sheet 2 measured in the direction of the horizontal scanning or the size measured in the direction perpendicular to the feeding direction of the sheet 2.

The same above principle is applicable also when the background of the sheet 2 is dark. In this case, the mirror 4 is located immediately below the white reference image PW, as shown by the continuous line in FIG. 7A, and the same procedure as described above is performed.

Figure 15:
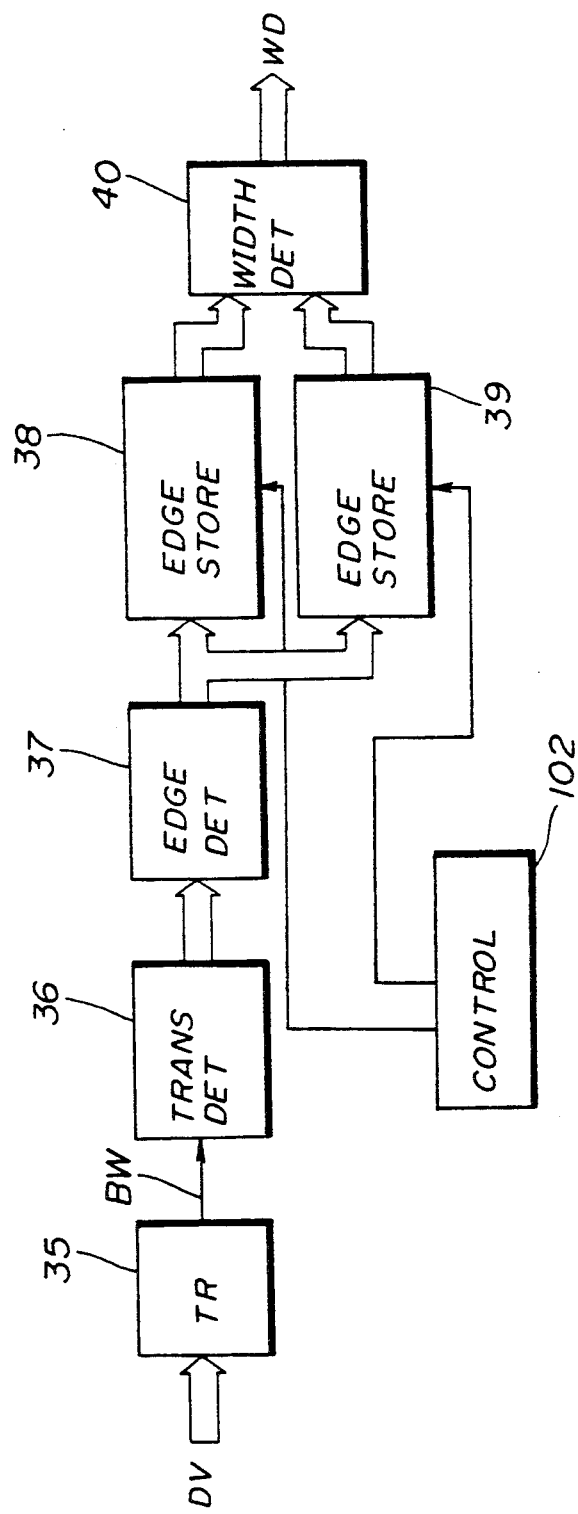
FIG. 15 is a block diagram showing the third embodiment of the present invention for detecting the size of the sheet.

FIG. 15 shows a circuit used for the purpose of sheet width detection o the basis of the foregoing principle. It should be noted that this circuit is connected after the circuit of FIG. 8 and used in combination with the construction of FIGS. 7A and 7B. As the circuit of FIG. 8 and the construction of FIGS. 7A and 7B have already been described, the description of these parts will be omitted.

Referring to FIG. 15, the digital image data DV produced by the circuit of FIG. 8 for one horizontal scanning line is supplied serially to a threshold detection circuit 35 for discriminating the level of the incoming digital data with respect to the threshold TR. The threshold detection circuit 35, in response, produces a binary logic signal BW having a logic level which indicates whether the level of the digital image data DV has exceeded the threshold TR or not, and this output signal BW is supplied to a transition detection circuit 36. The transition detection circuit 36 detects the transition of the signal BW from the low level state to the high level state corresponding to the detected image change from the white to black and further detects the transition from the high level state to the low level state corresponding to the detected image change from the black to white. In response to the detection, the circuit 36 produces an output indicative of the detection and this output is supplied to a sheet edge detection circuit 37. The sheet edge detection circuit 37 produces an output indicative of the position of the sheet edge in response to the output of the circuit 36, and the output of the circuit 37 is stored either in a sheet edge detection memory 38 or another sheet edge detection memory 39 under the control of the controller 102, as will be described later. Further, the content of the memories 38 and 39 are read out by a sheet width detection circuit 40 which detects, on the basis of the content read out from the memories 38 and 39, the width of the sheet 2. The result of this detection is outputted as a digital data WD.

Next, the operation of the circuit of FIG. 15 for sheet width detection will be described concerning the case of the image reading apparatus of the sheet feeding type or the case of operating the dual mode image reading apparatus in the sheet feeding mode.

First, the user places the sheet 2 on the predetermined region defined on the press pad 11 so that one of the side edges of the sheet 2 contacts the guide plate 12 and extends therealong. This position of the side edge contacting the guide plate is illustrated in FIG. 14 as "ORIGIN".

In operation, the controller 102 controls the feed rollers 13 and 14 (FIG. 1) so that the sheet 2 is transported to the image reading location A shown in FIG. 7A. When the sheet 2 has reached the location A, the controller 102 deenergizes the driving of the feed rollers 13 and 14. Further, the controller 102 controls the memories 38 and 39 so that the content of the memory 38 is updated by the output of the sheet edge detection circuit 37 while the updating of the content of the memory 39 is disabled. Under this condition, the image for one line is detected by the line image sensor 8 and the position on the horizontal scanning line where the transition of the logic state of the signal BW occurs is detected by the transition detection circuit 36 and the edge detection circuit 37. This position, represented in FIG. 14C as "x" and corresponding to the other side edge of the sheet 2, is subsequently stored in the memory 38. It should be noted that, when the background of the sheet 2 is white, the output analog image signal AV may not show a sharp transition at the side edge x and the detection of the side edge by the circuit 36 may become erroneous. On the other hand, when the background of the sheet 2 is dark, a clear transition of the output image signal AV is detected and the position of the side edge x can be determined accurately.

Next, the controller 102 moves the mirror 4 to the position A' shown in FIG. 7A and the reading of the image for one line is performed similarly to the foregoing case. In response thereto, the detection of the width of the sheet 2 is performed using the black reference image PB as the background and the the position x of the side edge of the sheet 2 is determined clearly for the sheet having a white background. This time, the result of this detection is stored in the memory 39.

In response to the position x stored in the memories 38 and 39, the sheet width detection circuit 40 detects the width of the sheet 2 by selecting one of the data which is closer to the origin and outputs this value x as the output data WD. It should be noted that the other data provides a value of x which corresponds to the full width of the horizontal scanning range and should be discarded. This output data WD is used in the following stage as a reference data for discriminating the part of the digital image data DV outside the width of the sheet 2.

Detection of the length of the sheet 2 may be performed in a way similar to that performed by the prior art apparatus by using a sensor and the like. This detection of the length of the sheet is not within the scope of the present invention and thus further description will be omitted.

The present embodiment provides an advantageous feature in that the detection of the width of the sheet 2 is made with a resolution or accuracy which is comparable to the resolution at the time of reading of the image. Further, a continuous detection or continuous monitoring of the sheet width is possible. Thus, the present embodiment is extremely useful when reading the pages of a document wherein sheets of various sizes are mixed. Further, the present embodiment is not limited to the construction wherein the guide plate 12 is used as the origin of the side edge of the sheet but may be applicable to a case where both of the side edges of the sheet 2 are detected to detect the width of the sheet.

Next, a fourth embodiment of the present invention for detecting skew of sheet feeding will be described.

It is well known that the image reading apparatus tends to cause a problem of skewing when operating in the sheet feeding mode wherein the sheet is fed obliquely with respect to the intended direction of sheet feeding. Such a skew may be caused as a result of an error in the initial setting of a document, an error in the direction of feeding by the feed rollers, or an inequality in the driving force of the feed rollers. When the skew occurs, the image read from the sheet may be distorted. Further, the lines extending along the side edge of the sheet or extending perpendicularly to the side edge may become excessively jagged. Such a deterioration of the quality of the image may necessitate a number of attempts to read the image in order to achieve a reading with a satisfactory quality.

FIGS. 16A–16D are diagrams showing the principle of detection of the skewing of the image which is employed in the present embodiment.

Figures 16A, 16B, 16C, 16D:
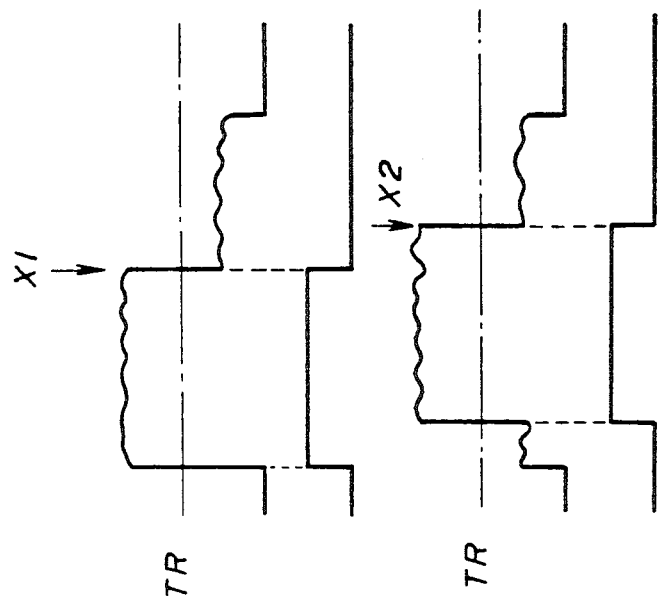
FIGS. 16A–16D are diagrams for explaining the detection of skew of the sheet according to a fourth embodiment of the present invention.

FIG. 16A shows the output image data DV for one line which is obtained by reading an image recorded on the sheet 2 having the white background. The reading of this image is performed by moving the sliders 9 and 10 so that the mirror 4 is located immediately below the black reference image PB, as shown by the broken line in FIG. 7A. As will be seen in FIG. 16A, the level represented by the output image data DV from the analog-to-digital converter 21 decreases suddenly in correspondence to the side edge of the sheet 2 represented by "x". FIG. 16B shows a corresponding output BW after the image data DV in the threshold detection circuit 35 of FIG. 15 has been processed.

When there is no skew in the feeding of the sheet, the position of this side edge x1 does not change at the beginning and at the end of the image reading. However, when there is a skew, the position of the side edge may change to a position x2 at the end of reading of the sheet, as shown in FIG. 16C. Thus, the output BW of the threshold detection circuit shown in FIG. 16D reflects this shift of the side edge to the position x2, and the detection of the skewing can be made by comparing the output BW of FIG. 16B at the beginning of the image reading and the output BW of FIG. 16D at the end of the image reading.

Figure 17:
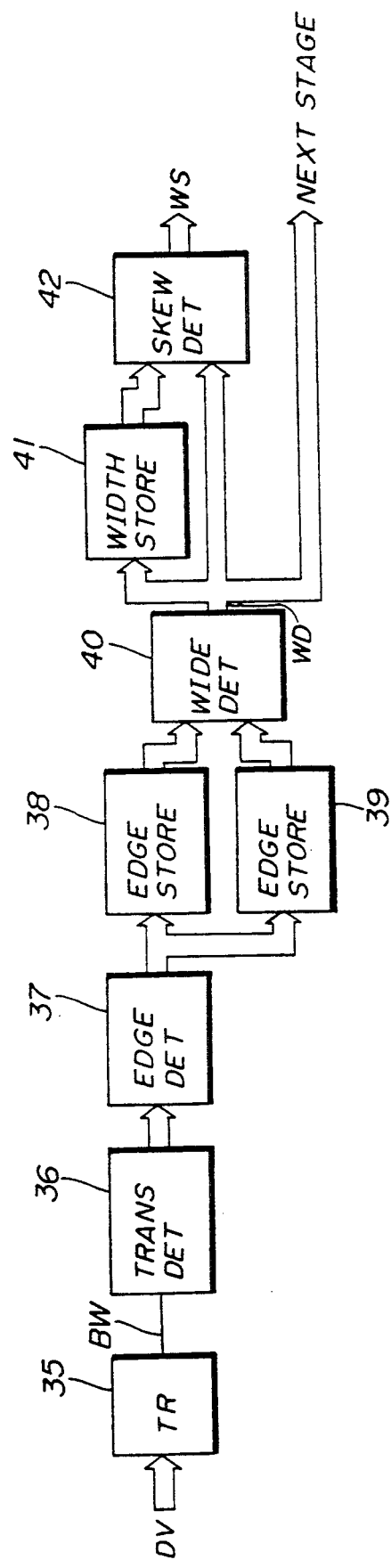
FIG. 17 is a block diagram showing the fourth embodiment of the present invention for detecting the skew of the sheet.

FIG. 17 shows a circuit used for the detection of skewing. In FIG. 17, the parts corresponding to those described previously with reference to FIG. 15 are given identical reference numerals and the description thereof will be omitted.

In this circuit, the output WD of the sheet width detection circuit 40 is supplied on the one hand to a memory 41 and on the other hand to a skew detection circuit 42 as a first input signal, in addition to feeding this output to the next stage. The output of the memory 41 is further supplied to the skew detection circuit 42 as another input signal, and the skew detection circuit 42 discriminates whether the difference between the first input signal and the second input signal has exceeded a predetermined limit or not. The fist input signal corresponds to the position x1 detected at the beginning of the image reading and the second input signal corresponds to the position x2 detected at the end of the image reading. Thus, if the result of discrimination is YES, this means that the difference between the first position x1 and the second position x2 is increased beyond a tolerable limit and the skew detection circuit 42 produces an output WS indicating the occurrence of the skew. This output WS may be supplied to the controller 102 to prohibit the further feeding operation of the sheet 2.

According to the construction of the present embodiment, the controller of the image reading apparatus can take necessary steps such as prohibiting the feeding of a sheet or sending a warning to the user upon detection of the skew. Thereby, deterioration of the quality of the image read by the apparatus is prevented.

Further, the present invention is not limited to these embodiments described heretofore, but various variations and modifications may be made thereof without departing from the scope of the invention.

What is claimed is:

1. An image reading apparatus for reading an image on a sheet, comprising:

image reading means for scanning a predetermined area including the sheet scanning line by scanning line, said image reading means reading an image pattern on the predetermined area including the image on the sheet and producing an output image signal indicative of the image;

a white reference image part provided within said predetermined area so as to be scanned by the image reading means;

a black reference image part provided within said predetermined area so as to be scanned by the image reading means;

white reference memory means supplied with the output image signal from the image reading means in response to the image reading means scanning the white reference image part, for storing the output image signal supplied thereto;

black reference memory means supplied with the output image signal from the image reading means in response to the image reading means scanning the black reference image part, for storing the output image signal supplied thereto;

image correction means supplied with the output image signal from the image reading means line sequentially in response to the image reading means scanning the sheet, said image correction means being supplied further with a first reference signal indicative of the image signal stored in the white reference memory means and with a second reference signal indicative of the image signal stored in the black reference memory, for producing a corrected image signal so that the corrected image signal has a maximum level corrected with reference to the first reference signal and a minimum level corrected with reference to the second reference signal; and control means for controlling the white reference memory means and the black reference memory means so that the white reference memory means stores the output image signal of the image reading means only when the image reading means scans the white reference image part and so that the black reference memory means stores the output image signal of the image reading means only when the image reading means scans the black reference image part;

wherein said image correction means comprises an analog-to-digital converter supplied with the output image signal from the image reading means for producing a digital image data, said analog-to-digital converter being supplied with the first reference signal and the second reference signal from respectively the white and black reference memory means for setting the range of the incoming image signal from the image reading means, and said digital image data being supplied selectively to the white reference memory means and to the black reference memory means under the control of the control means; and wherein said white reference memory means and said black reference memory means comprise first and second line buffers for storing the digital image data corresponding to one line and first and second analog-to-digital converters respectively connected to the first and second line buffers for producing said first and second reference signals.

2. An apparatus as claimed in claim 1 in which said controller controls the first and second digital-to-analog converters so that the first reference signal is set to a maximum output value which the first digital-to-analog converter is capable of providing when the image reading means is scanning the white reference image part and so that the second reference signal is set to a minimum output value which the second digital-to-analog converter is capable of providing when the image reading means is scanning the black reference image part.

3. An apparatus as claimed in claim 2 in which said apparatus further comprises a peak hold circuit supplied with the output image signal from the image reading means in response to the reading of the image on the sheet for detecting a maximum level thereof and a bottom hold circuit supplied with the output image signal from the image reading means in response to the reading of the image on the sheet for detecting a minimum level thereof, said peak hold circuit being connected to the first digital-to-analog converter for modifying the first reference signal in response to the maximum level detected, and said bottom hold circuit being connected to the second digital-to-analog converter for modifying the second reference signal in response to the minimum level detected.

4. An image reading apparatus for reading an image on a sheet, comprising:

image reading means for scanning a predetermined area including the sheet scanning line by scanning line, said image reading means reading an image pattern on the predetermined area including the image on the sheet and producing an output image signal indicative of the image;

a white reference image part provided within said predetermined area so as to be scanned by the image reading means;

a black reference image part provided within said predetermined area so as to be scanned by the image reading means;

white reference memory means supplied with the output image signal from the image reading means in response to the image reading means scanning the white reference image part, for storing the output image signal supplied thereto;

black reference memory means supplied with the output image signal from the image reading means in response to the image reading means scanning the black reference image part, for storing the output image signal supplied thereto;

image correction means supplied with the output image signal from the image reading means line sequentially in response to the image reading means scanning the sheet, said image correction means being supplied further with a first reference signal indicative of the image signal stored in the white reference memory means and with a second reference signal indicative of the image signal stored in the black reference memory, for producing a corrected image signal so that the corrected image signal has a maximum level corrected with reference to the first reference signal and a minimum level corrected with reference to the second reference signal; and control means for controlling the white reference memory means and the black reference memory means so that the white reference memory means stores the output image signal of the image reading means only when the image reading means scans the white reference image part and so that the black reference memory means stores the output image signal of the image reading means only when the image reading means scans the black reference image part;

wherein said image reading means comprises a movable optical system provided so as to be moved by the controller at least to such an extent that the optical system scans the white reference image part and the black reference image part; and wherein said movable optical system comprises a movable mirror supported rotatably about an axis extending in a direction parallel to the scan of the image reading means, said movable mirror being controlled by the controller between a first state and a second state so that the image reading means produces the output image data corresponding to the white reference image part when the mirror is in the first state and the output image data corresponding to the black reference image part when the mirror is in the second state.

5. An image reading apparatus for reading an image on a sheet, comprising:

image reading means for scanning a predetermined area including the sheet scanning line by scanning line, said image reading means reading an image pattern on the predetermined area including the image on the sheet and producing an output image signal indicative of the image;

a white reference image part provided within said predetermined area so as to be scanned by the image reading means;

a black reference image part provided within said predetermined area so as to be scanned by the image reading means;

white reference memory means supplied with the output image signal from the image reading means in response to the image reading means scanning the white reference image part, for storing the output image signal supplied thereto;

black reference memory means supplied with the output image signal from the image reading means in response to the image reading means scanning the black reference image part, for storing the output image signal supplied thereto;

image correction means supplied with the output image signal from the image reading means line sequentially in response to the image reading means scanning the sheet, said image correction means being supplied further with a first reference signal indicative of the image signal stored in the white reference memory means and with a second reference signal indicative of the image signal stored in the black reference memory, for producing a corrected image signal so that the corrected image signal has a maximum level corrected with reference to the first reference signal and a minimum level corrected with reference to the second reference signal;

control means for controlling the white reference memory means and the black reference memory means so that the white reference memory means stores the output image signal of the image reading means only when the image reading means scans the white reference image part and so that the black reference memory means stores the output image signal of the image reading means only when the image reading means scans the black reference image part; and sheet feeding means for so feeding the sheet that the image on the sheet is scanned by the image reading means in response to the feeding of the sheet;

wherein said image reading means comprises a movable optical system provided so as to be moved by the controller at least to such an extent that the optical system scans the white reference image part and the black reference image part.

6. An apparatus as claimed in claim 5 in which said sheet feeding means feeds the sheet such that the sheet passes by the white reference image part and the black reference image part, said white reference image part and the black reference image part being provided such that the white reference image part and the black reference image part are located behind the sheet when viewed from the image reading means.

7. An image reading apparatus for reading an image on a sheet, comprising:

image reading means for scanning a predetermined area including the sheet scanning line by scanning line, said image reading means reading an image pattern on the predetermined area including the image on the sheet and producing an output image signal indicative of the image;

a white reference image part provided within said predetermined area so as to be scanned by the image reading means;

a black reference image part provided within said predetermined area so as to be scanned by the image reading means;

white reference memory means supplied with the output image signal from the image reading means in response to the image reading means scanning the white reference image part, for storing the output image signal supplied thereto;

black reference memory means supplied with the output image signal from the image reading means in response to the image reading means scanning the black reference image part, for storing the output image signal supplied thereto;

image correction means supplied with the output image signal from the image reading means line sequentially in response to the image reading means scanning the sheet, said image correction means being supplied further with a first reference signal indicative of the image signal stored in the white reference memory means and with a second reference signal indicative of the image signal stored in the black reference memory, for producing a corrected image signal so that the corrected image signal has a maximum level corrected with reference to the first reference signal and a minimum level corrected with reference to the second reference signal; and control means for controlling the white reference memory means and the black reference memory means so that the white reference memory means stores the output image signal of the image reading means only when the image reading means scans the white reference image part and so that the black reference memory means stores the output image signal of the image reading means only when the image reading means scans the black reference image part;

wherein said white reference image part and said black reference image part are carried on a movable part which is moved by the controller between a first state and a second state so that the image reading means scans the white reference image part when the movable part is in the first state and the black reference image part when the movable part is in the second state.

8. An apparatus as claimed in claim 7 in which said movable part is moved parallel to the sheet between the first state and the second state.

9. An apparatus as claimed in claim 7 in which said movable part is provided rotatably between the first state and the second state about an axis extending parallel to the scanning line.

10. An image reading apparatus for reading an image on a sheet, comprising:

image reading means for scanning a predetermined area including the sheet scanning line by scanning line, said image reading means reading an image pattern on the predetermined area including the image on the sheet and producing an output image signal indicative of the image;

a white reference image part provided within said predetermined area so as to be scanned by the image reading means;

a black reference image part provided within said predetermined area so as to be scanned by the image reading means;

white reference memory means supplied with the output image signal from the image reading means in response to the image reading means scanning the white reference image part, for storing the output image signal supplied thereto;

black reference memory means supplied with the output image signal from the image reading means in response to the image reading means scanning the black reference image part, for storing the output image signal supplied thereto;

image correction means supplied with the output image signal from the image reading means line sequentially in response to the image reading means scanning the sheet, said image correction means being supplied further with a first reference signal indicative of the image signal stored in the white reference memory means and with a second reference signal indicative of the image signal stored in the black reference memory, for producing a corrected image signal so that the corrected image signal has a maximum level corrected with reference to the first reference signal and a minimum level corrected with reference to the second reference signal; and control means for controlling the white reference memory means and the black reference memory means so that the white reference memory means stores the output image signal of the image reading means only when the image reading means scans the white reference image part and so that the black reference memory means stores the output image signal of the image reading means only when the image reading means scans the black reference image part;

wherein said white reference image part and said black reference image part are provided in parallel to the scanning line so as to alternately repeat the white reference image part and the black reference image part, and the control means controls the white reference memory means and the black reference memory means such that the output image data corresponding to the white reference image part is stored in the white reference memory means and the output image data corresponding to the black reference image part is stored in the black reference memory means.

11. An image reading apparatus for reading an image on a sheet and detecting the size of the sheet, comprising:

image reading means for scanning a predetermined area including the sheet scanning line by scanning line, said image reading means reading an image pattern on the predetermined area including the image on the sheet and producing an output image signal indicative of the image;

a white reference image part provided within said predetermined area so as to be scanned by the image reading means, said white reference image part being adapted such that the sheet is passed above the white reference image part when the image reading means scans the predetermined area;

a black reference image part provided within said predetermined area so as to be scanned by the image reading means, said black reference image part being adapted so that the sheet is passed above the black reference image part when the image reading means scans the predetermined area;

sheet feeding means for feeding the sheet passing above the white reference image part and the black reference image part so that the sheet is scanned by the image reading means;

control means for controlling the image reading means so that the image reading means scans the sheet in correspondence to where the sheet passes above the white reference image part and in correspondence to where the sheet passes above the black reference image part; and sheet width detection means supplied with the output image signals of the image reading means obtained in correspondence to the image reading means reading a first image pattern wherein the sheet is passed above the white reference image part and in correspondence to the image reading means reading a second image pattern wherein the sheet is passed above the black reference image part, for detecting the width of the sheet measured along the scanning line.

12. An apparatus as claimed in claim 11 in which said sheet width detection means comprises a transition detection circuit supplied with the output image signal of the image reading means in correspondence to the image reading means reading the first image pattern for producing a first output indicative of a detection of a level transition of the output image signal supplied thereto, said transition detection circuit being further supplied with the output image signal of the image reading means in correspondence to the image reading means reading the second image pattern for producing a second output indicative of a detection of a level transition of the output image signal supplied thereto, a line position detection circuit supplied with the first output of the transition detection circuit and the second output of the transition detection circuit, for determining a position on the scanning line where the level transition has occured in the image signal from the image reading means for both the first output and the second output, and a sheet width detection circuit supplied with a first line position output signal from the line position detection circuit indicative of the position on the line where the level transition has occured in the image signal of the image reading means when reading the first image pattern and a second line position output signal from the line position detection circuit indicative of the position on the line where the level transition has occured in the image signal from the image reading means when reading the second image pattern, for determining a first sheet width representing the width of the sheet on the basis of the first line position output signal and a second sheet width representing the width of the sheet on the basis of the second line position output signal, said sheet width detection circuit selecting either the first or second sheet width, whichever is smaller in magnitude.

13. An apparatus as claimed in claim 12 in which said apparatus further comprises skew detection means supplied with an output of the sheet width detection circuit at a first instance and a second instance later in time, said skew detection means comparing the outputs of the sheet width detection circuit at the first and second instances to produce an output indicative of the detection of a skew on the basis of the comparison.

* * * * *